United States Patent
Bhogal et al.

(10) Patent No.: US 8,306,995 B2
(45) Date of Patent: Nov. 6, 2012

(54) INTER-ORGANIZATIONAL AND INTRA-ORGANIZATIONAL REPOSITORY FOR OPERATING SYSTEM IMAGES

(75) Inventors: Kulvir S. Bhogal, Pflugerville, TX (US); Rick A. Hamilton, II, Charlottesville, VA (US); Andrew R. Jones, Round Rock, TX (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/876,736

(22) Filed: Sep. 7, 2010

(65) Prior Publication Data

US 2012/0059805 A1    Mar. 8, 2012

(51) Int. Cl.
    *G06F 17/30* (2006.01)
(52) U.S. Cl. ......................... 707/769; 707/770
(58) Field of Classification Search ................ None
    See application file for complete search history.

(56) References Cited

U.S. PATENT DOCUMENTS

| | | | |
|---|---|---|---|
| 4,937,863 A | 6/1990 | Robert et al. | |
| 6,338,149 B1 * | 1/2002 | Ciccone et al. | 714/38.12 |
| 7,177,961 B2 | 2/2007 | Brice, Jr. et al. | |
| 7,290,115 B2 | 10/2007 | Hill et al. | |
| 2003/0097554 A1 | 5/2003 | Cheston et al. | |
| 2005/0160420 A1 | 7/2005 | Kruta et al. | |
| 2006/0005181 A1 * | 1/2006 | Fellenstein et al. | 717/174 |
| 2006/0161972 A1 * | 7/2006 | Cromer et al. | 726/5 |
| 2006/0230282 A1 | 10/2006 | Hausler | |
| 2006/0277025 A1 | 12/2006 | Iszlai et al. | |
| 2007/0078982 A1 | 4/2007 | Aidun et al. | |
| 2007/0162521 A1 | 7/2007 | Raghunath | |
| 2007/0283009 A1 | 12/2007 | Takemura | |
| 2008/0046708 A1 | 2/2008 | Fitzgerald et al. | |
| 2008/0104588 A1 | 5/2008 | Barber et al. | |
| 2008/0114666 A1 | 5/2008 | Jiao et al. | |
| 2008/0163194 A1 | 7/2008 | Dias et al. | |
| 2008/0271017 A1 | 10/2008 | Herington | |
| 2009/0307685 A1 | 12/2009 | Axnix et al. | |

OTHER PUBLICATIONS

"About Operating System Deployment Image Management", http://msdn.microsoft.com/en-us/library/cc144720.aspx, accessed on May 25, 2010, 2 pages.
"Orchestrate and Simplify Workloads for IBM System z", IBM Corporation, Tivoli Beat, http://www.-01.ibm.com/software/tivoli/beat/05042010.html, May 4, 2010, 3 pages.
"Provision Your Way to Better Service Management with IBM", http://www-01.ibm.com/software/tivoli/beat//04272010.html, Apr. 27, 2010, 5 pages.

* cited by examiner

*Primary Examiner* — Baoquoc N To
(74) *Attorney, Agent, or Firm* — Stephen J. Walder, Jr.; Libby Z. Toub

(57) ABSTRACT

Mechanisms are provided for collaborating between two or more operating system image repository systems. A first operating system image (OSI) repository system is associated with a second OSI repository system. Each of the first and second OSI repository systems store one or more OSIs for use either natively or virtually by client computing devices. One or more collaboration rules are defined that define a manner by which OSI information in the first OSI repository system is shared with the second OSI repository system. A collaborative operation is performed between the first OSI repository system and the second OSI repository system. An extent of the collaborative operation is circumscribed by application of the one or more collaboration rules.

25 Claims, 5 Drawing Sheets

INTER-ORGANIZATIONAL AND INTRA-ORGANIZATIONAL REPOSITORY FOR OPERATING SYSTEM IMAGES

BACKGROUND

The present application relates generally to an improved data processing apparatus and method and more specifically to mechanisms for providing an inter-organizational and intra-organizational repository for operating system images.

There are several technologies in existence today that allow one to create images of computer operating systems that can be used either virtually or natively on computer hardware system. These technologies include software such as virtual machine software (VMWare), the AIX operating system's Network Install Manager, and other similar types of system backup/restore solutions. The operating system image itself is a copy of the entire state of the operating system and any applications associated with the operating system at a particular point in time. Such operating system images may be generated and stored for later restoration of a computing device to a previous state, for example.

These operating system image technologies allow large organizations to save time and money when deploying new systems in an information technology environment. That is, when setting up a new computer in an organization, the most time consuming process is the process of installing and configuring the operating system and all of the different software programs that are to be used by that computer system. Large organizations that have to configure many computing devices may utilize a pre-configured operating system image to install the operating system and its associated software programs. Such a process can be performed quickly and without having to be attended by information technology personnel. Moreover, a plurality of different operating system images may be generated for different types of computing devices within the organization, e.g., a different operating system image for computers in a personnel department as opposed to computers in an accounting department.

SUMMARY

In one illustrative embodiment, a method, in a data processing system, is provided for collaborating between two or more operating system image repository systems. The method comprises associating a first operating system image (OSI) repository system with a second OSI repository system. Each of the first and second OSI repository systems store one or more OSIs for use either natively or virtually by client computing devices. The method further comprises defining one or more collaboration rules that define a manner by which OSI information in the first OSI repository system is shared with the second OSI repository system. Moreover, the method comprises performing a collaborative operation between the first OSI repository system and the second OSI repository system. An extent of the collaborative operation is circumscribed by application of the one or more collaboration rules.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
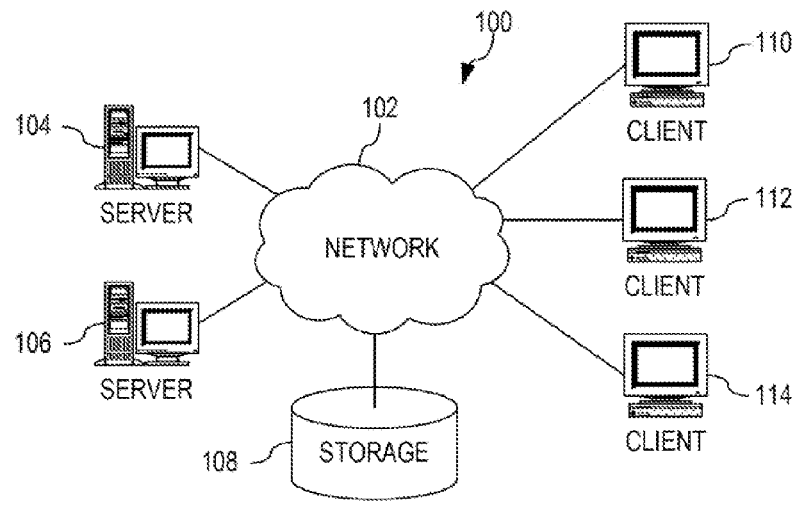
FIG. 1 is an example block diagram of a distributed data processing system in which aspects of the illustrative embodiments may be implemented.

As mentioned above, various technologies exist for allowing one to create an operating system image and then use that operating system image to install an operating system and its related application software on one or more computers. While such technologies exist for generating operating system images, there is currently no adequate mechanism for managing the collection of such operating system images in such a way as to promote reusability. While some of these technologies have mechanisms for allowing one to select an operating system image to be installed or distributed, none provide an advanced mechanism for finding and managing the operating system images. This can be troublesome in large organizations that may have a large number of established operating system images for various types of computing devices and organizational purposes.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide mechanisms for providing an inter-organization and intra-organization repository of operating system images. That is, the illustrative embodiments provide an operating system image repository mechanism and a license management system that aids the repository with tracking of software licenses. Furthermore, mechanisms are provided for sharing the information regarding the repository and licenses within and between organizations. These mechanisms allow for the sharing of information between multiple operating system image repositories either within a single organization or between multiple organizations. As a result, the mechanisms of the illustrative embodiments allow for improved utilization of the operating system image assets contained within a repository (thereby saving time and money in creation, management, and upgrading operating system images) and also allow for improved utilization of software licenses.

Figure 2:
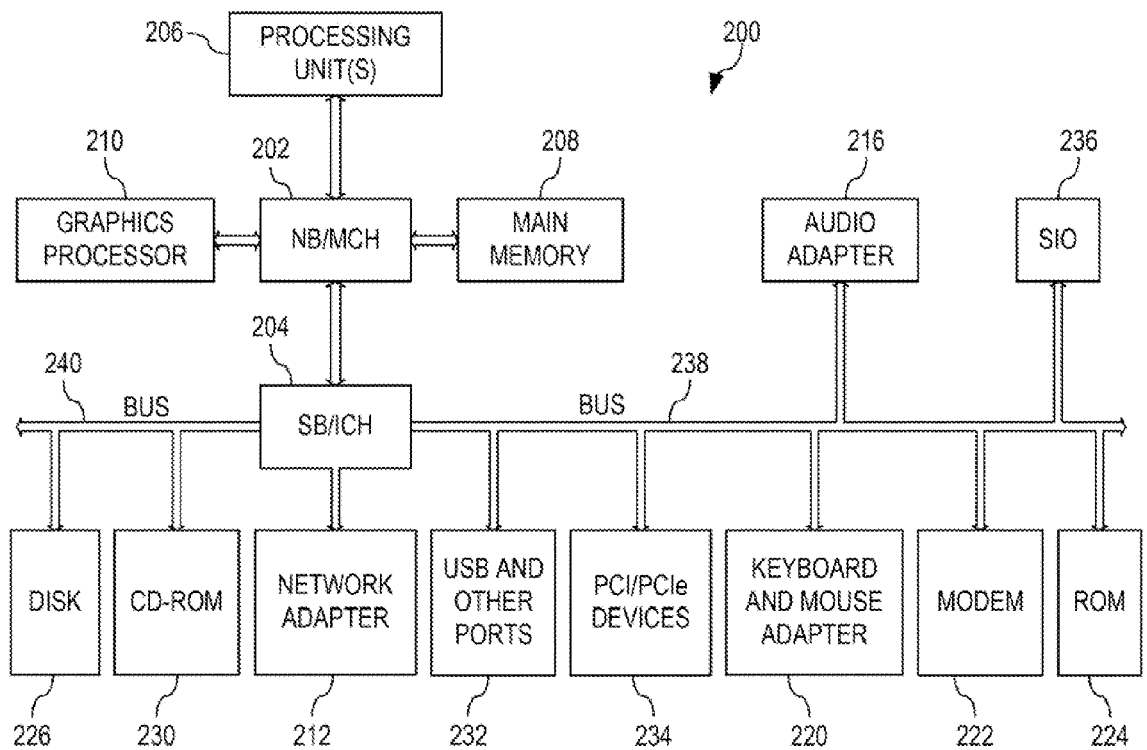
FIG. 2 is an example block diagram of a data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX') operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Turning again to FIG. 1, in accordance with the mechanisms of the illustrative embodiments, one or more of servers 104 or 106 may provide an operating system image repository for storing operating system images for use in installing and configuring operating systems and software on one or more of the client computing devices 110, 112, and 114, for example. The actual operating system image data itself may be stored on the servers 104 and/or 106, or may be stored in one or more network attached storage devices, such as storage device 108, and made accessible to the servers 104 and 106. The servers 104 and/or 106 may provide software and/or hardware logic for accessing such operating system images and providing appropriate operating system images for installation on client computing devices 110, 112, and 114, or for virtual use by client computing devices 110, 112, and 114, i.e. the operating system image may be executing on the server 104 or 106 but is accessed by the client computing devices 110, 112, and 114 as if the operating system image were running natively on the client computing devices 110, 112, and 114. The servers 104 and 106 may provide multiple operating system images either for native installation and execution on the client computing devices 110, 112, and 114, or for virtual execution.

In addition, servers 104 and 106 may provide hardware and/or software logic for managing software licenses associated with the various operating system images. Furthermore, the servers 104 and 106 may provide hardware and/or software logic for managing the sharing of operating system image and software license information amongst the servers 104 and 106, or with other operating system image repositories (not shown) both within an organization associated with the servers 104 and 106, or between two or more organizations. This logic and the operation of the mechanisms of the illustrative embodiments will be described in greater detail hereafter.

As mentioned above, the mechanisms of the illustrative embodiments provide three primary improvements over known operating system image mechanism. First, the illustrative embodiments provide mechanisms for providing one or more operating system image (OSI) repositories. Second, the illustrative embodiments provide mechanisms for managing software licenses associated with OSIs in such repositories. Third, the illustrative embodiments provide mechanisms for sharing the OSI and software license information amongst computing devices within an organization and between organizations.

Figure 3:
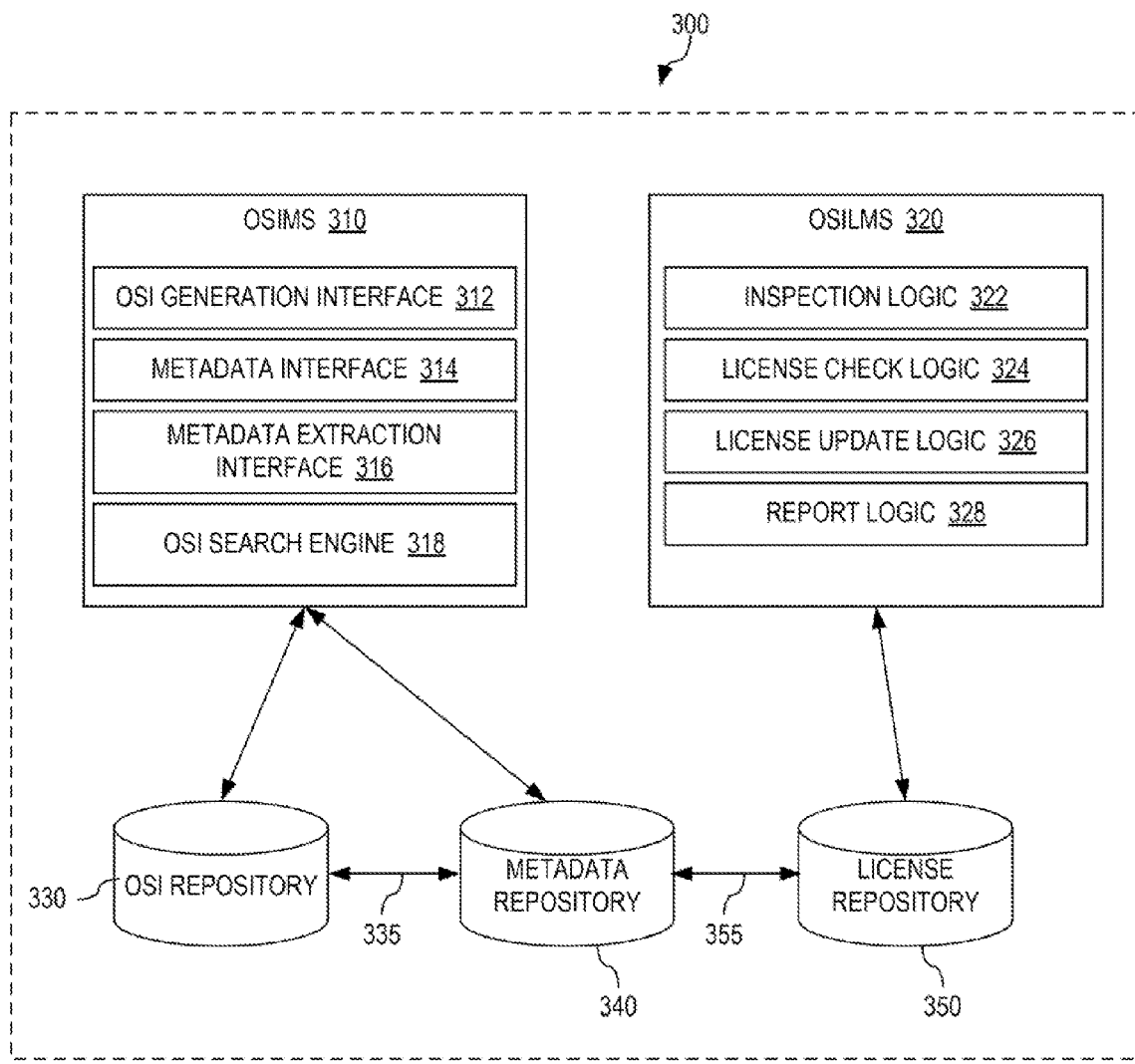
FIG. 3 is an example block diagram illustrating the primary operational elements of a repository system in accordance with one illustrative embodiment.

FIG. 3 is an example block diagram illustrating an example of a repository system in accordance with one illustrative embodiment. The elements shown in FIG. 3 may be implemented in hardware, software, or any combination of hardware and software. For example, in one illustrative embodiment, the operational elements may be implemented as software instructions executed by one or more processors of the repository system 300. The storage elements may be implemented as hardware storage devices with software being provided to facilitate access and management operations with regard to the data stored within these hardware storage devices.

As shown in FIG. 3, the repository system 300 includes an operating system image management system (OSIMS) 310, an operating system image license management system (OSILMS) 320, an operating system image (OSI) repository storage device or devices 330, a metadata repository storage device or devices 340, and a license repository storage device or devices 350. The OSIMS 310 stores the actual data corresponding to the various OSIs maintained by the repository system 300. These OSIs may be generated using any known mechanism or later developed mechanism for generating operating system images that include an image of the entire running state of the operating system, the operating system's associated application instances, and the memory state of the operating system and its associated application instances. Because such mechanisms for generating OSIs are generally known in the art, a detailed explanation of how to generate an OSI is not provided herein.

The metadata repository 340 stores metadata about the various OSIs maintained in the OSI repository 330. This metadata may be generated manually, such as by a system administrator or the like, or may be obtained through an automated process, e.g., a program that extracts information about characteristics of the OSIs. For example, this metadata may include information such as the type and version of the operating system and any sub-components of the operating system included in the OSI, the names and versions of any applications included in the OSI, hardware platforms supported by the OSI, license information (e.g., Nodelock files, license keys, etc.), system configuration information such as identifiers provisioned, network configuration information, and the like.

The OSIMS 310 is responsible for managing the storage of these OSIs in the OSI repository 330 and providing mechanisms for accessing these OSIs within the OSI repository 330. As such, the OSIMS 310 provides mechanisms for storing various formats of OSIs in the OSI repository 330, storing metadata describing said OSIs in the metadata repository 340, providing functionality for performing end-user searches for OSIS based upon OSI characteristics as specified in the metadata for the OSIs, a functionality to provide "best fit" results of a search, update a "best fit" OSI with required updates and submit a new OSI to the OSI repository 330, a functionality to receive requests from users for new OSIs and provide notifications for generating a new OSI based on requests, a functionality to automatically generate a request for an OSI to be produced based upon repeated common search requests with no or inadequate search results, and controlling which users can access the various ones of these functionalities based on user roles or access levels.

Thus, the OSI repository 330 may store a plurality of different formats of OSIs that may be generated by any known or later developed OSI generating software/hardware. The OSIMS 310 provides an interface through which a user may input metadata information about OSIs. For example, if a user, such as a system administrator, generates a new OSI and stores the OSI in the OSI repository 330 using OSI generation interface 312, the user may enter characteristic information into the metadata repository 340 that describes the operating system, sub-components of the operating system, applications, hardware platforms supported by the OSI, and the like, via the metadata interface 314. Alternatively, or in addition, this information may be obtained from the OSI automatically, such as by metadata extraction engine 316, with or without the ability for the user to augment this information with his/her own metadata information via the metadata interface 314. The metadata information may be stored in the metadata repository 340 with a link 335 to the OSI to which it pertains in the OSI repository 330. This metadata may then be used as a basis for user searches for selecting a "best fit" OSI having characteristics that match or at least partially match search criteria entered via a search interface of the OSIMS 310.

The OSIMS 310 provides a OSI search engine 318 which provides a user interface and logic for performing a search of the OSI metadata in the metadata repository 340 to identify an OSI in the OSI repository 330 that is a "best fit" to OSI characteristics entered as search criteria via the user interface of the OSI search engine 318. Thus, for example, a user may enter search criteria comprising a particular operating system (e.g., Microsoft Windows™, IBM AIX™) and/or specific version/release (e.g., AIX 3.2.1), particular applications by name and/or version (e.g., WebSphere™ Application Server 6.1 and DB2 9.2), deployable hardware platforms (e.g., Intel 386 or better, Power 4 or better, etc.), more general criteria such as any operating system kernel with support for symmetric multiprocessors (SMP), or the like. This search criteria may then be compared against the metadata entries in the metadata repository 340 and results may be returned as to which metadata entries match or partially match the search criteria. These search results may be ranked and/or sorted according to a degree to which the metadata entries match or partially match the search criteria such that, for example, the metadata entries that more substantially match the search criteria are listed prior to the metadata entries that have a lower degree of matching of the search criteria.

The ranking of search results may be more complex than simply finding the ones with the most metadata information matching the search criteria. Rather, a relative weighting may be associated with different characteristics either corresponding to the search criteria or being related to the characteristics corresponding to the search criteria so as to determine a "best fit" result for the search criteria. For example, a best fit may be the metadata entry corresponding to an OSI that has the most installed applications matching search criteria that run on the operating system and hardware platform specified in the search criteria. Alternatively, a best fit may be the metadata entry corresponding to an OSI that has a "closest" version of a required application or operating system (e.g., search for WebSphere Application Server (WAS) version 6.1.1, but the closest OSI has version 6.1.0). These determinations of "best fit" may be made even though the total number of matching search criteria for a particular metadata entry may indicate that a different metadata entry should be higher ranked. Thus, for example, number of installed applications may be weighted higher than version number of the operating system or the like. Other weightings or analysis of the characteristics matching search criteria and their related characteristics may be made without departing from the spirit and scope of the illustrative embodiments. Such weightings and analysis may be specified in rules or the like that may be implemented in the logic of the OSI search engine 318.

In response to the identification of a "best fit" OSI using the OSI search engine 318, a determination may be made by the OSIMS 310 as to whether the best fit OSI needs to be updated. That is, the OSI may be analyzed and compared against version/release information maintained in the OSIMS 310 regarding the most recent versions/releases of the operating systems and applications included in the best fit OSI. If a newer version/release of the operating system and/or applications in an OSI exists, the OSIMS 310 may automatically update the operating system and/or applications in the OSI so that they may be up to date. Thus, a new OSI may be generated with the newer versions/releases of the operating system and/or applications automatically without requiring a system administrator to intervene and generate the OSI manually.

Alternatively, a notification that newer versions/releases may be sent to a system administrator so that the system administrator may initiate the generation of a new OSI with the newer versions/releases. The new OSI may then be stored in the OSI repository 330 with associated metadata in the metadata repository 340 generated in a similar manner as described above.

A user may select an OSI from the results returned by the search engine 318 for use in installing and configuring the OSI on a computing device or using the OSI virtually through running the OSI on the server and accessing it by way of a client computing device. Mechanisms for virtual and/or native installation, configuration, and execution of OSIs on servers and/or client computing devices are generally known in the art and thus, a more detailed explanation is not provided herein.

The OSIMS 310 further comprises logic for receiving requests from users for an OSI to be generated that meets their needs. For example, upon performing a search of metadata for the OSIs in the metadata repository 340, a user may determine that the results obtained are not satisfactory. As a result, the user may select an option to submit a request for an OSI to be generated that matches the search criteria entered by the user in the search engine 318. An interface may then be provided by which the user may add to or remove from this search criteria to further specify the criteria for the generation of a new OSI. This request may be submitted to the OSIMS 310 via this interface at which point the OSIMS 310 may generate a notification to a system administrator so that the system administrator can determine whether to generate and deploy the requested OSI. Alternatively, the OSIMS 310 may initiate an automated mechanism for generating the requested OSI and corresponding metadata for inclusion in the OSI repository 330 and metadata repository 340. For example, the OSI can be extracted/built from a running instance of an image, during an instance provisioning process, or via a search capability of an OSI. If an automated provisioning is used to build an OSI, metadata may be automatically generated that may be fed into the metadata repository 340. From a running instance, configuration metadata and system inventory can be retrieved, e.g., on Linux, "rpm-query" may be used to identify what packages are installed and on AIX, a "lslpp" command may be used to get a list of installed software.

Moreover, the OSIMS 310 may comprise logic for maintaining a history of searches performed and the results of those searches so as to determine whether a new OSI needs to be generated. For example, the OSIMS 310 may determine that a search for a particular combination or sub-combination of OSI characteristics has been made more than a threshold number of times with a result being a matching metadata entry having less than a threshold degree of matching. As an example, the OSIMS 310 may determine that a search including an operating system of AIX 3.2.1 with the WebSphere Application Server (WAS) 6.1 has been submitted X number of times with the results being less than M. If X is greater than the threshold, then the OSIMS 310 may determine that a new OSI having AIX 3.2.1 and WAS 6.1 should be generated. As a result, a notification may be sent to a system administrator or automated mechanisms for generating the OSI and its related metadata may be initiated in a similar manner as described above.

These operations may be controlled by the OSIMS 310 so that only privileged users may access certain operations while other less privileged users may access other operations. For example, the operations for the creation of OSIs may be controlled so that only system administrators may access these operations while users of OSIs may be given access to submit searches, send requests for new OSIs, and the like.

As shown in FIG. 3, the repository system 300 further includes an operating system image license management system (OSILMS) 320 and a license repository storage device or devices 350. The OSILMS 320 provides hardware and/or software logic to track software licenses associated with OSIs in the OSI repository 330. The OSILMS 320 provides functionality for inputting license information as metadata about the OSI and all of its installed components and their associated licenses, automatically inspect an OSI for licensed products and update the OSI's license metadata, query running instances of OSIs and see what products/licenses are being used, integrate with other license management systems to see what licenses are available and being used, validate a user's licenses associated with an OSI to ensure that appropriate licenses are available for use of an OSI, discriminate between licenses supported by an OSI and those desired to be used by a user, acquire licenses when necessary, run reports regarding licenses, and determine if licenses should be upgraded based upon usage of OSIs.

The OSIMS 320 provides an interface through which a user may manually enter license information for various operating systems, applications, and the like, that may be used in the OSIs in the OSI repository 330. The entry of such license information may involve, for example, specifying the name of the operating system, application, or the like (hereafter referred to collectively as "products"), the number of instances of the product for which the organization is licensed, the duration of the license, license identifier numbers, and any other particular information regarding the terms and conditions of the license. The license information is maintained as metadata information in the license repository 350. The license repository 350 may store entries for products in general as well as have entries for the individual OSIs executing on servers and/or client devices in the organization. Thus, for example, the license repository 350 may have an entry specifying that the organization has 10 licenses for use of WAS 6.1 and may have another entry stating that a particular OSI is using one of the 10 licenses of WAS 6.1. This entry associated with a particular OSI may be linked 355 to the OSI in the OSI repository 330 such that one can access the license information about the OSI via such a link 355. The entry associated with an individual OSI may store license information for the OSI and all of its installed components.

The OSILMS 320 further provides inspection logic 322 that inspects OSIs in the OSI repository 330 to determine the licensed products included in the OSIs. This may involve retrieving a corresponding metadata entry in the metadata repository 340 and determining the products listed in the OSI's metadata, for example. This information may be used to update the license metadata in the license repository 350 for the identified products and/or the OSI. For example, this information may represent the possible usage of products/licenses by inclusion of the products in OSIs.

The inspection logic 322 may further inspect running instances of OSIs to determine what products are being used in these OSIs. This may be done, for example, by the inspection logic 322 sending a request to the server computing device to return information regarding instances of products currently running on the server computing device. Alternatively, this inspection may be done within the OSI player software (not shown) in the server or client computing devices that send messages to the OSILMS 320 regarding product/license usage. This information, again, may be used to update license metadata for products and/or OSI so as to reflect the actual usage of produces in general and/or within OSIs, as opposed to the possible usage of products and/or licenses.

The OSILMS 320 may comprise license check logic 324 that may be used to check a user or client device's ability to utilize a license before allowing that user or client device to access products of an OSI. Such checks may be made based on the license metadata in the license repository 350. For example, the license metadata may indicate a total number of instances of a product that may be allowed to execute at a same time as well as a total number of instances of a product currently executing in OSIs on the server computing device or over one or more client computing devices. From this information, the license check logic 324 may determine whether an additional instance of the product may result in more instances than are permitted under the current license structure. Such checks can be made with regard to a plurality of products of an OSI requested by the user or client device such that a determination may be made as to whether the user/client device should be allowed to access the OSI, only a portion of the OSI, or the like.

Moreover, if it is determined that the user/client device should not be allowed to access the OSI because too many licenses for a product would be required, or some other license criteria for a product would be violated, a more appropriate OSI may be selected from the OSI repository using the OSI search engine 318. For example, if it is determined that one product used in the requested OSI cannot be provided due to licensing restrictions, then the license check logic 324 may invoke the OSI search engine 318, or use previously generated search results used for obtaining the selected OSI, to search for a similar OSI that does not include the product that is the source of the licensing restriction. An option to use the new OSI may then be presented to the user/client device and if it is taken, this replacement OSI may be utilized by executing it on either the server or the client device, depending on the implementation. Alternatively, the product that is the source of the licensing restriction may be removed from the installation of the OSI so that it is not in violation of the current licensing arrangement.

The OSILMS 320 may further provide license update logic 326 that may operate to request changes in licensing terms and conditions, e.g., increases or decreases in the number of permitted instances of a product, and to update such license metadata information in the license metadata repository 350. Such requests may be performed, for example, in response to a user's request to update the license terms and conditions for a product. Alternatively, the OSILMS 320 may maintain a history data structure (not shown) that stores information regarding the number of instances of products used over various periods of time, the number of requests to use OSIS that resulted in a potential license violation, and the like. This information may be used to determine which products need to have their license terms and conditions modified and when to request such modifications. The license update logic 326 of the OSILMS 320 may then automatically generate corresponding requests and update license metadata in the repository 350 accordingly. These requests may be sent to product provider licensing servers to obtain modified licensing terms and conditions which may then be communicated back to the OSILMS 320 such that the license update logic 326 may update the corresponding license metadata in the repository 350.

Furthermore, the OSILMS 320 provides report logic 328 for generating reports for viewing what licenses are being used from the OSI repository 330, which are not being used or are being underutilized, which licenses need to have their terms/conditions modified, and the like. The report logic 328 may generate a variety of reports associated with the utilization of licenses for the various products either on a product basis or on an OSI basis.

Thus, the illustrative embodiments provide mechanisms for providing an managing a repository of operating system images and licenses for products included in such operating system images. The illustrative embodiments increase OSI utilization and license utilization by provide a mechanism for searching for OSIs that are a best fit to user/client device needs as well as a mechanism for checking license terms and conditions with regard to such OSIs and modifying the provided OSI based on current license terms and conditions.

In addition to the above mechanisms for providing a OSI repository and license manager, the illustrative embodiments further provide mechanisms for enabling collaboration between two or more OSIMS/OSILMS systems. Such collaboration may include cross-searches of multiple OSIMS/OSILMS, transfers of OSIs and licenses between OSIMS/OSILMS, and mechanisms for ensuring the validity of the contents of OSIs and licenses as well as communicating a level of trust with regard to such OSIs and licenses between OSIMS/OSILMS.

Figure 4:
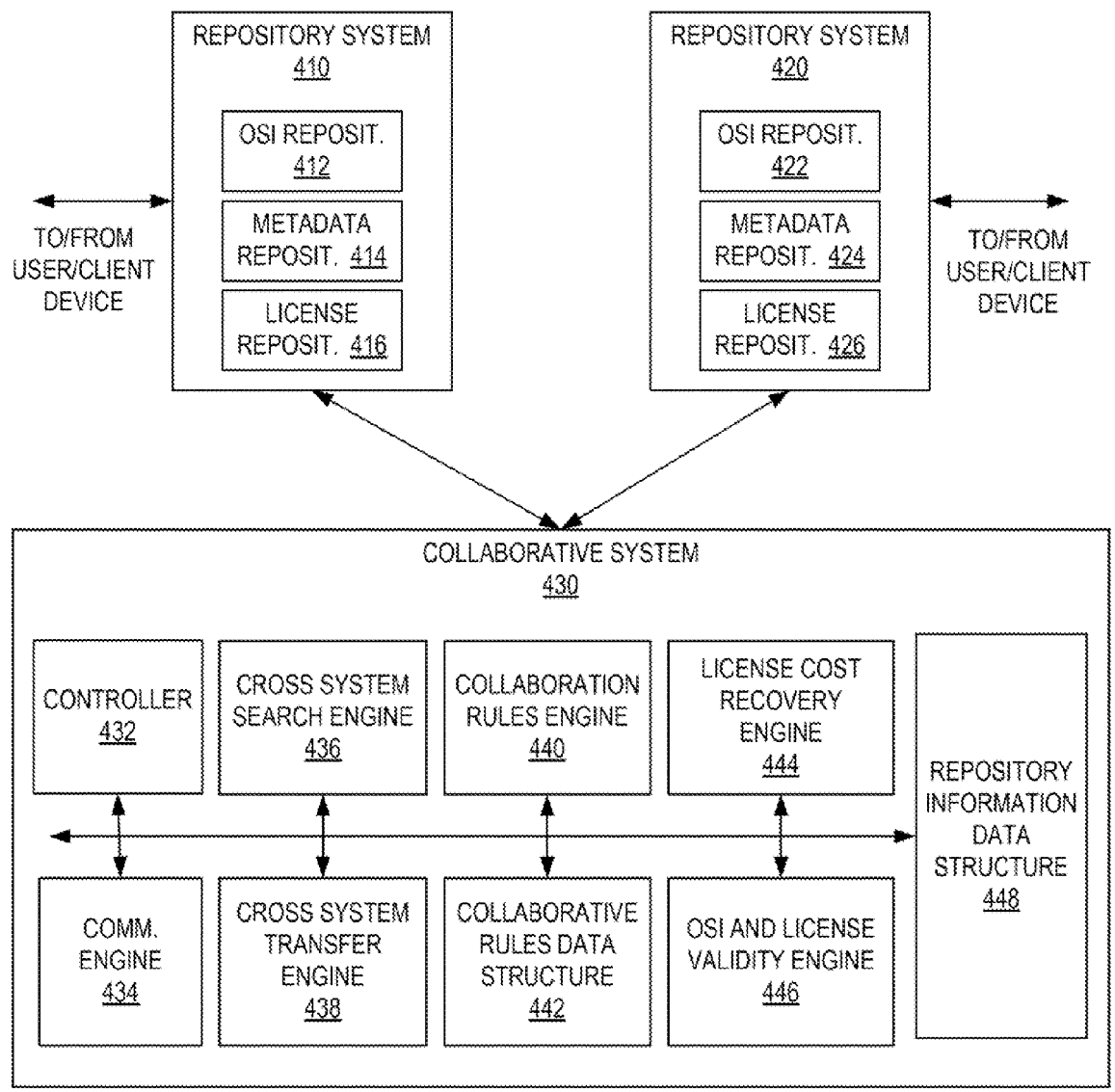
FIG. 4 illustrates the primary operational elements of a collaborative system for collaborating between multiple repository systems in accordance with one illustrative embodiment.

FIG. 4 illustrates the primary operational elements of a collaborative system for collaborating between multiple repository systems in accordance with one illustrative embodiment. The elements shown in FIG. 4 may be implemented in hardware, software, or any combination of hardware and software. For example, in one illustrative embodiment, the elements 432-448 of the collaborative system 430 are implemented as software instructions executed by one or more processors using other hardware resources of the collaborative system 430.

As shown in FIG. 4, two or more repository systems 410 and 420 may be provided that have a configuration similar to that described above with regard to FIG. 3. A repository collaboration system 430 is further provided for orchestrating and controlling the collaboration of the repository systems 410 and 420. While the repository collaboration system 430 is shown in FIG. 4 as being a separate system from repository systems 410 and 420, it should be appreciated that the collaboration system 430, or portions of the collaboration system 430, may be integrated into the repository systems 410 and/or 420 without departing from the spirit and scope of the illustrative embodiments. In one illustrative embodiment, for example, each repository system 410 and 420 may have an integrated collaboration system 430 which may manage and control the collaboration of its associated repository system 410, 420 with other repository systems 410, 420. In such an embodiment, such collaboration may be facilitated by communications between the collaboration systems on each of the repository systems, for example.

The collaboration system 430 comprises a controller 432, a communication engine 434, a cross system search engine 436, a cross system transfer engine 438, a collaboration rules engine 440, a collaboration rules data structure 442, a license cost recovery engine 444, and a OSI and license validity engine 446, and a repository information data structure 448. The controller 432 controls the overall operation of the collaboration system 430 and orchestrates the operation of the other elements 434-448. The communication engine 434 controls communication between the collaboration system 430 and the repository systems 410-420 as well as provides a user interface through which a user may access other elements of the collaboration system 430. In embodiments where the collaboration system 430 communicates with other collaboration systems 430 to manage and control collaborative use of the respective repositories, the communication engine 434 comprises logic for facilitating such communications between collaboration systems.

The cross system search engine 436 provides mechanisms for replicating an OSI search, such as from an OSI search engine 318 in FIG. 3, on a first repository system 410, in other repository systems 420 and then collecting the results of the searches on a plurality of repository systems 420 and presenting the results of these searches in a unified manner to a user via the repository mechanisms of the repository system 410 that received the initial search request from the user or client device. For example, a user may submit a OSI search request to the OSI search engine 318 of repository system 410. As a result, as mentioned above, a search of the metadata repository 340 of the repository system 410 is made with comparisons between metadata and search criteria being used as a basis for retrieving metadata entries and presenting results to the user for consideration in selecting an OSI to utilize. This process is extended by the collaboration system 430 to a plurality of repository systems 410-420 by replicating the search request to the other repository systems 410-420.

For example, when a search request is received in a first repository system 410, the first repository system 410 may transmit the search request to the collaborative system 430. The collaborative system 430 may receive in the request, an identifier of the first repository system 410 and perform a lookup operation in the repository information data structure 448. The repository information data structure 448 stores information about each repository system 410-420 supported by the collaborate system 430 as well as the associations between repository systems 410-420. For example, repository system 410 may be associated with a first organization, e.g., business, governmental department, or the like, and the second repository 420 may be associated with a second organization. If these two organizations have an association such that they have agreed to collaborate with regard to their OSI repositories and licensing of products, then these repository systems 410 and 420 may be associated with one another in the repository information data structure 448. If these two organizations have not agreed to a collaboration, then their repository systems 410 and 420 would not be associated with one another in the repository information data structure 448.

Thus, through a lookup operation in the repository information data structure 448, the collaborative system 430 may be informed as to what other repository systems are associated with the first repository system 410, e.g., repository system 420, as well as the necessary information for contacting the associated repository systems. Moreover, the repository information data structure 448 may store identifiers of collaborative rules to be applied to collaborations between the first repository system 410 and associated repository systems 420. Such rules may be generic to all associated repository systems or may be specific to each associated repository system. The identifiers of the rules to be applied to the collaborations may be used to retrieve such rules from the collaborative rules data structure 442.

Having identified the associated repository systems 420 and their associated collaborative rules via the lookup in the repository information data structure 448, the cross system search engine 436 may replicate the search request received by the first repository system 410 on a second repository system 420, and additional associated repository systems (not show) if they exist. The results from the search on the first and second repository systems 410 and 420 may be sent to the collaborative system 430 where the cross system search engine 436 collects and combines these results, removing duplicates, ranking the relative results, and the like. The cross system search engine 436 may then send the results to the first repository system 410 for presentation to a user for selection of an OSI for use by the user or client computer either natively or virtually.

In the case where the user selects an OSI that is not present on the first repository system 410, the cross system transfer engine 438 may transfer the OSI, and its associated metadata from the OSI repository 422 and metadata repository 424 on the repository system 420 where it is located, to the OSI repository 422 and metadata repository 414 of the first repository system 410 for use by the user. In addition, the license, or a portion of license, metadata may be transferred from the license repository 426 to the license repository 416. The transfer of the license metadata is handled differently from the transfer of the OSI and its metadata since the OSI and its metadata will not be used, or components of the OSI may not be used, if a corresponding license is not available at the repository system 410. Thus, one can freely provide the OSI and metadata to the repository system 410, but the license must be more safe-guarded to ensure proper utilization of the OSI and its components.

With regard to the transfer of license metadata, a portion of the license metadata may be transferred rather than having to transfer the entire license over from one repository system 420 to another 410. That is, for example, individual instances may be transferred rather than transferring all of the instances over from one repository system 420 to the other 410. Thus, if an OSI is to be used on both repository systems 410 and 420, the repository system 420 may transfer the license information to the repository system 410 via the cross system transfer engine 438 and may indicate that the repository system 410 is only permitted to allow one instance of the OSI and/or its components to be executing at any given time. In this way, the license is actually split between repository systems 410 and 420. Moreover, the repository system 420 may set an expiration time at which the repository system 410 is no longer able to utilize the license that was transferred over. Once the license expires, the license metadata may be automatically removed from the license repository 416 and the OSI and metadata may or may not be removed as well from the repositories 412 and 414. In one illustrative embodiment, the OSI and metadata are left in the repositories 412 and 414 for searching purposes, but may not be able to be used without acquiring a new license. The mechanisms discussed above for obtaining or updating a license may be used to acquire such a new license or extend an existing license.

The license cost recovery engine 444 operates based on information regarding the sharing of licensed products in shared OSIs to keep track of and manage the costs associated with running the OSIs and their products. That is, the license cost recovery engine 444 may identify the OSIs that are being shared amongst repositories, such as by way of repository information data structure 448 which may identify in the entries for the repository systems which OSIs are being shared amongst associated repository systems, and may determine the relative portion of costs for licenses that is to be attributed to each of the owners of the repository systems 410 based on their respective usage of the OSI, the individual products or components of the OSI, the duration of usage, and the like.

The license cost recovery engine 444 may maintain entries for shared OSIs including date and time when the OSI was shared amongst the repository systems 410, 420, which repository systems 410, 420 are sharing the OSI, how much of the license is attributed to each of the repository systems 410, 420, a termination date and time for terminating the sharing of the OSI and corresponding license, and the like. This information may be used to calculate a shared cost for the OSI and its products/components such that the shared costs may be sent to the accounting systems (not shown) of the owners of the repository systems 410, 420. For example, a notification of a portion of the cost of an OSI and its license that originated in repository system 420 but is being shared by repository system 420 may be sent to a system administrator, accounting system, or the like, of repository system 410 such that the owners of repository system 410 may remit payment to the owners of repository system 420 for their use of the OSI and its license, or a portion thereof. A similar notification may be sent to a system administrator, accounting system, or the like, of the owner of the repository system 420 so that they are aware of the amount of money they are due from the owner of repository system 410.

The collaboration with regard to OSIs and licenses between repository systems 410 and 420 may be controlled by collaboration rules specified by one or more users, e.g., system administrators, via the collaboration rules engine 440. The collaboration rules engine 440 provides an interface through which a user may define new collaboration rules and select a set of collaboration rules to be applied to collaborations between repository systems 410 and 420. For example, a user may define collaboration rules via the collaboration rules engine 440 and may have those rules stored in the collaboration rules data structure 442. The user may then select a set of these rules stored in the rules data structure 442 to be applied to collaborations of a particular repository system 410 or 420. These rules may be selected for application in general to all collaborations of the particular repository system 410 or 420, or may be made specific to specific collaborations between the particular repository system 410, for example, and another particular repository system 420. A combination of general and specific collaboration rules may be used in association with a particular repository system 410 or 420.

Thus, for example, a user may set up a rule that says that repository system 420 is never allowed to share more than 1 instance of a license for each OSI with another repository system 410. This would be a general rule that applies to all collaborations associated with repository system 420. In addition, a user may set up a rule that says that OSIs with the WebSphere Application Server (WAS) product as part of the OSI cannot be shared with the repository system 410. This would be a specific rule associated with the particular collaboration of repository system 420 with repository system 410.

These rules may be stored in the collaboration rules data structure 442 for reuse and may have associated identifiers. The particular set of rules selected for a particular repository system 410 or 420 may have their corresponding rules identifiers stored in association with an entry for the repository system 410 or 420 in the repository information data structure 448. Thus, when a user wishes to establish a collaboration between repository systems 410 and 420, for example, the source repository system 420 may be the basis for the lookup operation in the repository information data structure 448, the corresponding collaboration rules may be retrieved, and the rules may be applied to the cross system search and/or transfer of OSIs, metadata, and licenses between the repository systems 410 and 420.

The OSI and license validity engine 446 may be used to ensure the validity of OSIs, metadata, and licenses being shared amongst the repository systems 410 and 420. For example, the OSI and license validity engine 446 may provide an interface through which a user, such as a system administrator, may digitally sign an OSI and its associated metadata and license information, to validate the contents of the OSI, metadata, and license information. The OSI and license validity engine 446 may further inspect OSIs, metadata, and license information before sharing to ensure that only digitally signed OSIs, metadata, and license information is shared amongst collaborating repository systems 410 and 420. In this way, the repository systems 410 and 420 are ensured the validity of the OSIs, metadata, and license information and can have a higher level of trust, thereby promoting the collaboration between the repository systems 410 and 420.

If a repository system tries to share an OSI, metadata, and/or license information that is not digitally signed, the OSI and license validity engine 446 may generate and present a notification to a user, e.g., system administrator, and an option may be given to accept the collaboration anyway, or cancel the collaboration. If the user selects to accept the collaboration anyway, then the collaboration occurs in a similar manner as discussed above. If the user chooses to cancel the collaboration, then the collaboration is aborted. In one illustrative embodiment, if an unsigned OSI is to be shared amongst repository systems 410 and 420, the OSI and license validity engine 446 may initiate a search of the repository systems 410 and 420 for a similar OSI that is signed and offer the similar OSI as an alternative to the user. For example, the search engine may iteratively remove components from the search for the OSI until a signed OSI having a sub-set of the components for the original non-signed OSI is found and then this signed OSI is presented as an alternative with an indication of which components are not included in this OSI that were included in the original unsigned OSI. If the user chooses to use this alternative, it may be natively or virtually executed in place of the original unsigned OSI.

As an example, assume that one company has two lines of businesses that have chosen to have separate repository systems. The company may have a corporate license for unlimited use of operating system X. The company may also have a corporate license for thirty copies of application Y. Line of business 1 (LOB1) has paid for twelve annual licenses for application Z that can be used anywhere in the company. This information is put into the respective license mechanisms of the illustrative embodiments. Assume that the licenses for application Y are evenly split between the two repositories. Given that, a user in line of business 2 (LOB2) requires an OSI with operating system X, application Y, and application Z. Since LOB2 does not have a license for application Z, and thus no OSI that meets the user's requirements, the illustrative embodiments may search the LOB2 repository to determine if there are any licenses available for application Z and marked as share-able across the company. If so, then the mechanisms of the illustrative embodiments may allow the user to select the corresponding OSI. In addition, if so required, the mechanisms of the illustrative embodiments may bill LOB2 for use of the license for application Z. Appropriate determinations based upon license information put into the mechanisms of the illustrative embodiments, e.g., number of licenses, whether the license may be shared within/outside the company, whether there can be cross organization charge backs, and the like, may be made using rules provided, for example, in the collaboration rules data structure 442. These rules may be both simple or complex.

Thus, the illustrative embodiments provide an OSI repository system, a license management system, and mechanisms for managing collaboration between a plurality of OSI repository systems. The management of the collaboration may be governed by rules created and associated with the OSI repository systems. That is, an extent of the collaborative operations between the OSI repository systems may be circumscribed by application of one or more collaboration rules defined, maintained, and applied by the mechanisms of the illustrative embodiments. All of these systems may work together to promote the use of OSIs and collaboration between repositories of OSIs, thereby making the installation and configuration of computing devices less time consuming and more user friendly.

Figure 5:
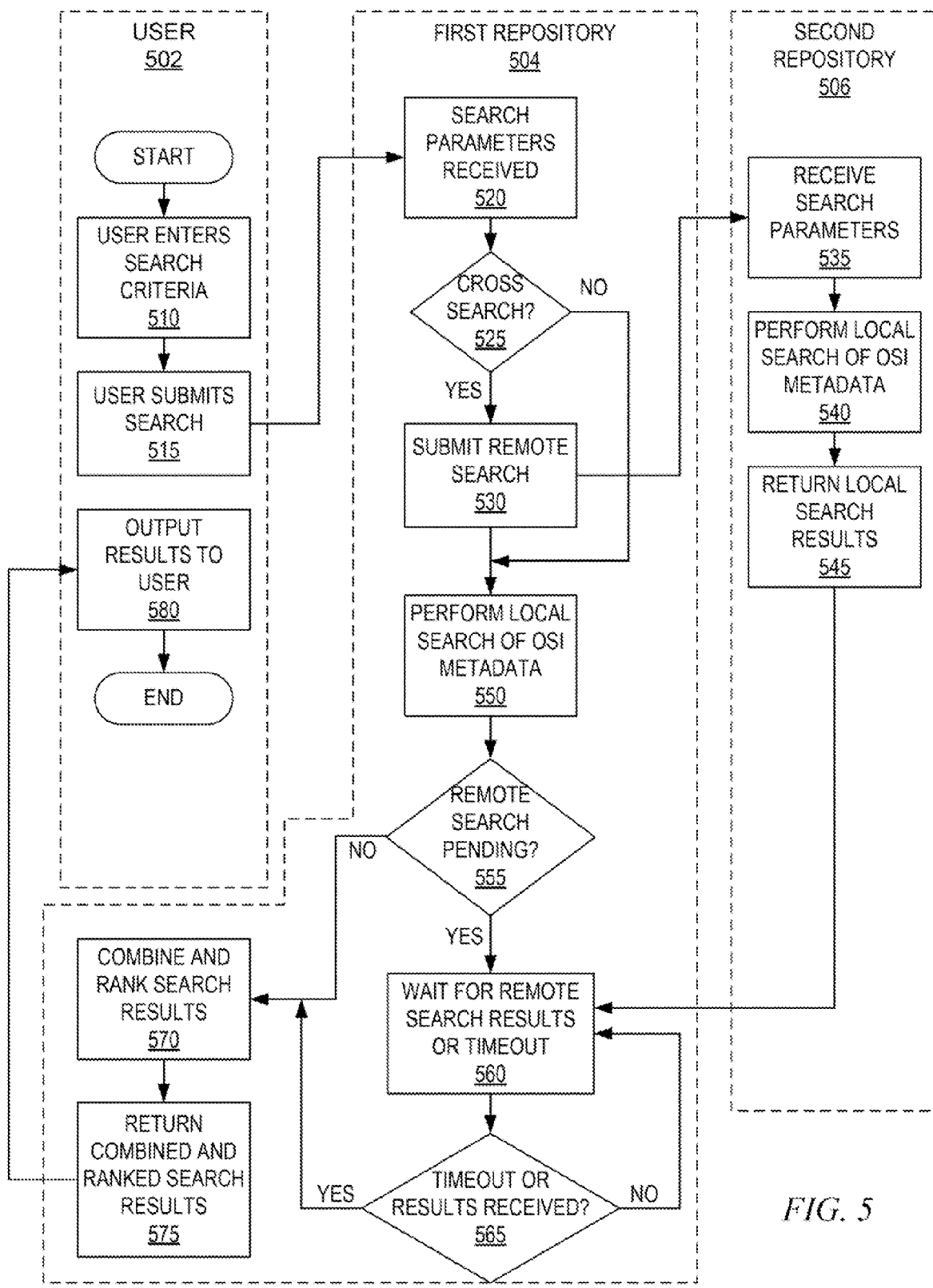
FIG. 5 is a flowchart outlining an example operation for performing such a cross-system search in accordance with one illustrative embodiment.

As mentioned above, one of the types of collaboration that is facilitated by the mechanisms of the illustrative embodiments is a cross-system search where a search for an OSI may be performed across a plurality of repository systems. FIG. 5 is provided as a flowchart outlining an example operation for performing such a cross-system search in accordance with one illustrative embodiment. FIG. 5 is one example of a collaboration that can be facilitated by the mechanisms of the illustrative embodiments. It should be noted that for simplicity of the description, the collaboration shown in FIG. 5 is only between two repository systems, but the concepts and mechanisms can be extended to any number of repository systems, as will be appreciated by those of ordinary skill in the art in view of the present description. It should also be noted that FIG. 5 is only an example of one type of collaboration and other types of collaborations, including transfer of OSIs, metadata, and licenses between repository systems, may also be performed, as described above.

As shown in FIG. 5, three swim lanes 502-506 are provided to illustrate the interaction of operations between the user 502, a first repository system 504, and a second repository system 506, with regard to performing the cross-system search. The operation starts with a user 502 entering search criteria into an interface for an OSI search engine of a first OSIMS of a first repository system 504 (step 510). The search is then submitted to the OSIMS of the first repository system 504 (step 515) where the search parameters are received (step 520) and a determination is made as to whether a cross system search is to be performed (step 525).

It is assumed for simplicity of the description here that the collaborative system is integrated with the OSIMS of the repository systems. Thus, the determination as to whether to perform a cross system search is performed within the first repository system 504. As described above, rather than having this integrated into the repository systems, a separate collaboration system could be used in which case a fourth swim lane would be present in FIG. 5 with operations performed by the collaborative system being provided in this fourth swim lane.

In order to determine whether a cross system search is to be performed, a collaborative system may perform a lookup operation in a repository information data structure of the collaborative system to determine if the repository system 504 to which the search was submitted is associated with any other repository systems. In the depicted example, the first repository system 504 is associated with a second repository system 506. As a result, a cross system search is to be performed in the depicted example.

With regard to the determination at step 525, if a cross system search is to be performed, a remote search is submitted to OSIMS of the associated repository system (step 530). This process may be repeated for each associated repository system if there is more than one. In the second repository system 506, the search parameters are received (step 535) from the first repository system 504 and a local search of the OSI metadata maintained in the second repository system 506 is performed (step 540). Results of the local search on the second repository system 506 are returned to the first repository system 504 in response to the local search being completed (step 545).

At approximately a same time, either after submitting the remote search request (step 530) or if a remote search is not to be performed, a local search of the OSI metadata maintained in the first repository system 504 is performed (step 550). A determination is made by the OSIMS of the first repository system 504 if there is a remote search pending (step 551). If so, then the OSIMS of the first repository system 504 waits for the remote search results to be returned or for a timeout condition to occur (step 560). If a timeout condition occurs or the results from the remote search are received (step 565), then the search results are combined and ranked (step 570) and returned to the user (step 575). The results are then output to the user (step 580) and the operation terminates. If a timeout condition does not occur or the results from the remote search have not been received, then the operation returns to step 560.

A similar collaboration can be performed with regard to licenses as previously described above. The license collaboration can be performed along with the search collaboration described above with regard to FIG. 5. For example, the license collaboration may be performed following step 570 in FIG. 5 above.

Figure 6:
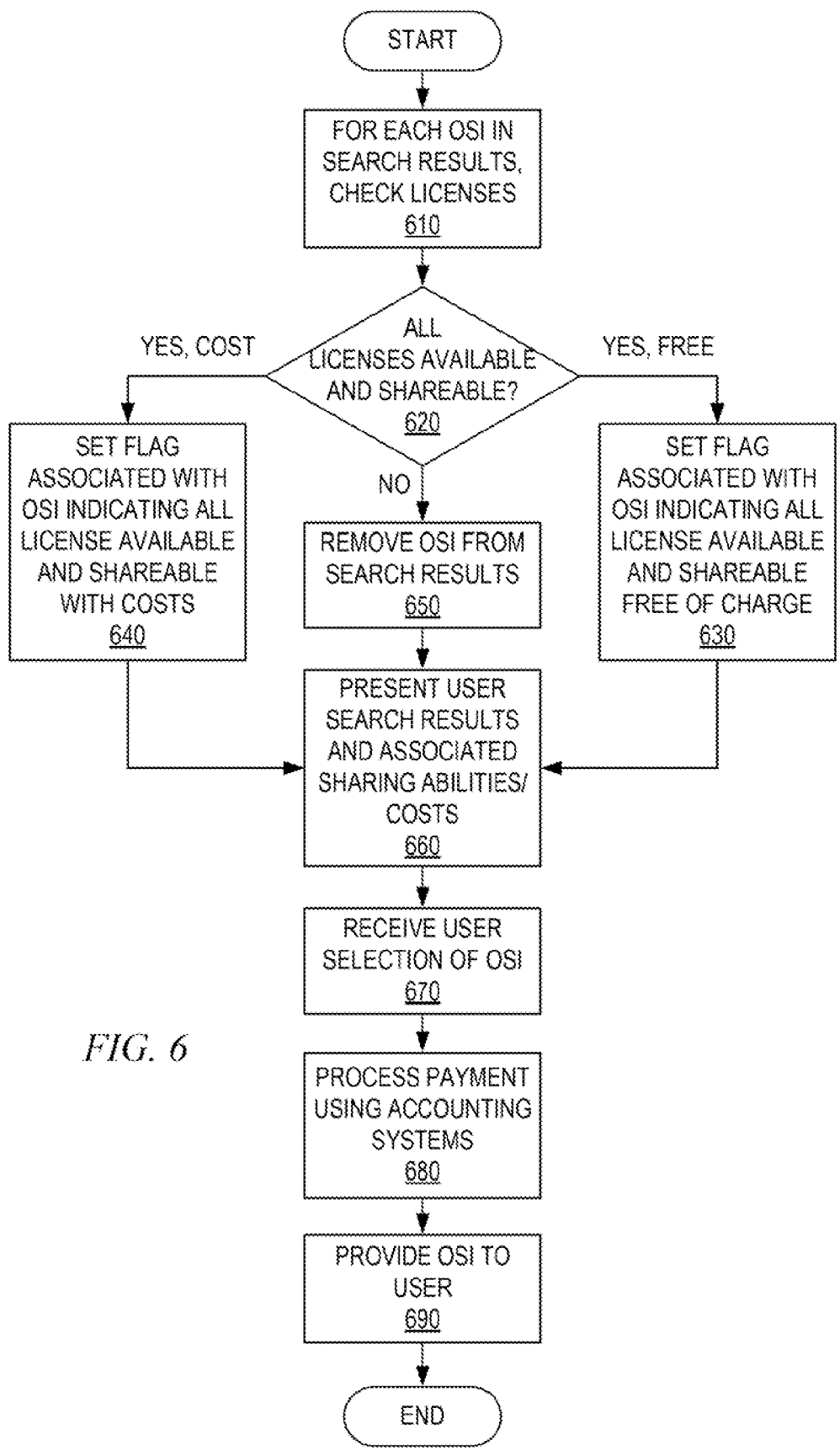
FIG. 6 is one example of a license collaboration that can be facilitated by the mechanisms of the illustrative embodiments.

FIG. 6 is one example of a license collaboration that can be facilitated by the mechanisms of the illustrative embodiments. The operation outlined in the flowchart of FIG. 6 may be performed, for example, following step 570 in FIG. 5. As shown in FIG. 6, the operation starts by iterating through the search results from all of the repositories as received in step 570 of FIG. 5 and checks all licenses for availability (step 610). A determination is made for each OSI as to whether all licenses for the OSI are available and shareable free of charge to the user (step 620). If all of the licenses are available for the OSI, then a flag may be associated with the OSI indicating that all licenses are available (step 630). If all licenses for the OSI are available and are shareable, but for a charge, to the user, another flag may be associated with the OSI indicating the availability of the OSI and a cost associated with the sharing of the licenses (step 640). If not all of the license for the OSI are available or are not shareable, then the OSI may be removed from the search results (step 650).

Thereafter, a user may be presented with the output of the search results and their associated ability for sharing associated licenses (step 660). The user may then select an OSI for use (step 670) and a corresponding charge may be made through an accounting system of the owner of the OSI and the user's associated accounting system (step 680). The OSI may then be provided to the user for use (step 690) and the operation may terminate.

Thus, through the collaboration mechanisms of the illustrative embodiments, a plurality of OSI repository systems may collaborate with each other with regard to searching for OSIs meeting the requirements of users who wish to natively or virtually execute these OSIs using their client computing devices. Moreover, as noted above, further collaborations with regard to actual transfer of OSIs, their metadata, and associated licensing information between repository systems is made possible through the mechanisms of the illustrative embodiments. Furthermore, mechanisms are provided for controlling such collaborations through the establishment and association of collaboration rules and mechanisms for ensuring validity of OSI and license information before allowing sharing of this information between repository systems. In addition, mechanisms are provided for monitoring and communicating the distribution of license costs among repository systems that are collaborating with one another based on the degree of collaboration with regard to individual OSIs and/or their components.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for collaborating between two or more operating system image repository systems, comprising:

associating a first operating system image (OSI) repository system with a second OSI repository system, wherein each of the first and second OSI repository systems store one or more OSIs for use either natively or virtually by client computing devices;

defining one or more collaboration rules that define a manner by which OSI information in the first OSI repository system is shared with the second OSI repository system; and performing a collaborative operation between the first OSI repository system and the second OSI repository system, wherein an extent of the collaborative operation is circumscribed by application of the one or more collaboration rules.

2. The method of claim 1, wherein each of the first and second OSI repository systems comprise metadata repositories, and wherein each metadata repository stores, metadata associated with OSIs in a corresponding one of the first and second OSI repository systems.

3. The method of claim 2, wherein the collaborative operation comprises:

receiving, in the first OSI repository system, a search request from a client computing device, the search request being a request to search for an OSI in the first OSI repository system to be provided for either native or virtual use by the client computing device;

submitting, by the first OSI repository system, the search request to the second OSI repository system; and combining, in the first OSI repository system, search results from execution of a search, corresponding to the search request, in each of the first OSI repository system and the second OSI repository system.

4. The method of claim 3, wherein the search request comprises criteria specifying characteristics of an OSI, and wherein the search in each of the first OSI repository system and second OSI repository system comprises applying the search criteria from the search request to metadata in the metadata repositories of the first OSI repository system and second OSI repository system to identify OSIs meeting the search criteria.

5. The method of claim 4, wherein the search criteria comprises at least one of a type of operating system in the OSI, a version/release of an operating system in the OSI, one or more particular applications in the OSI, one or more versions of particular applications in the OSI, and one or more deployable hardware platforms.

6. The method of claim 4, wherein combining the search results from execution of searches in the first OSI repository system and second OSI repository system further comprises, ranking OSIs in the combination of the search results based: on a degree of matching of the metadata for the OSIs with the search criteria.

7. The method of claim 5, wherein the ranking OSIs in the combination of the search results further comprises weighting a first search criterion in the search criteria with a different weight from a second search criterion in the search criteria.

8. The method of claim 3, further comprising:
determining a best fit OSI based on the search results; and
determining whether the best fit OSI needs to be updated.

9. The method of claim 8, wherein, in response to a determination that the best fit OSI needs to be updated, the method further comprises at least one of sending a notification to a system administrator that the best fit OSI needs to be updated or updating the best fit OSI, before providing the best fit OSI to the client computing device that submitted the search request.

10. The method of claim 3, further comprising:
receiving, in the first OSI repository system, a selection, from the client computing device, of an OSI from the combined search results; and
providing an instance of the selected OSI to the client computing device for either native or virtual use by the client computing device.

11. The method-of claim 10, wherein the collaborative operation further comprises checking license metadata associated with the selected OSI to determine whether all licenses associated with the selected OSI have availability for providing an instance of the selected OSI to the client computing device, and wherein the instance of the OSI is provided to the client computing device only if all licenses associated with the selected OSI have availability to be provided to the client computing device.

12. The method of claim 11, wherein the collaborative operation further comprises:
transferring at least a portion of a license associated with the selected OSI from the second OSI repository system to the first OSI repository system in response to the selected OSI being in the second OSI repository system.

13. The method of claim 12, further comprising:
processing payment for the transfer of the at least a portion of a license from the second OSI repository system to the first OSI repository system.

14. The method of claim 11, wherein in response to a determination that all licenses associated with the selected OSI do not have availability for providing the selected OSI to the client computing device, the method further comprises automatically selecting an alternative OSI from the combined search results that has available licenses for providing an instance of the alternative OSI to the client computing device.

15. The method of claim 11, wherein in response to a determination that all licenses associated with the selected OSI do not have availability for providing the selected OSI to the client computing device, the method further comprises removing one or more products for which licenses are not available from an instance of the selected OSI provided to the client computing device prior to providing the instance of the selected OSI to the client computing device.

16. The method of claim 1, further comprising:
maintaining, in the first OSI repository system, a history of search requests processed by the first OSI repository system;
determining, by the first OSI repository system based on the history of search requests, whether a new OSI should be generated and stored in the first OSI repository system; and
generating and storing the new OSI and its associated metadata in the first OSI repository system in response to a determination that a new OSI should be generated.

17. The method of claim , wherein the first OSI repository system and second OSI repository system each include an OSI license management system (OSILMS), and wherein the OSILMS controls sharing of licenses for OSIs in the first OSI repository system and second OSI repository system between the first OSI repository system and second OSI repository system.

18. The method of claim 12, wherein the OSILMS checks license availability for OSIs in a corresponding OSI repository system before providing an OSI to a client computing, device for use by the client computing device.

19. The method of 12, wherein the OSILMS comprises logic that inspects running instances of OSIs provided by a corresponding OSI repository system, determine which licensed products each running instance of an OSI is using based on the inspection, and update license metadata based on the determination of which licensed products each running instance of an OSI is using.

20. A computer program product comprising a computer readable storage medium having a computer readable program stored therein, wherein the computer readable program, when executed in a data processing system comprising a first operating system image (OSI) repository, causes the data processing system to:
associate the first OSI repository system with a second OSI repository system, wherein each of the first and second OSI repository systems store one or more OSIs for use either natively or virtually by client computing devices;
define one or more collaboration rules that define a manner by which OSI information in the first OSI repository system is shared with the second OSI repository system; and
perform a collaborative, operation between the first OSI repository system and the second OSI repository system, wherein an extent of the collaborative operation is circumscribed by application of the one or more collaboration rules.

21. The computer program product of claim 20, wherein each of the first and second OSI repository systems comprise metadata repositories, and wherein each metadata repository stores metadata associated with OSIs in a corresponding one of the first and second OSI repository systems.

22. The computer program product of claim 21, wherein the collaborative operation comprises:

receiving, in the first OSI repository system, a search request from a client computing device, the search request being a request to search for an OSI in the first OSI repository system to be provided for either native or virtual use by the client computing device;

submitting, by the first OSI repository system, the search request to the second OSI repository system; and combining, in the first OSI repository system, search results from execution of a search, corresponding to the search request, in each of the first OSI repository system and the second OSI repository system.

23. The computer program product of claim 22, wherein the computer readable program further causes the data processing system to:

receive, in the first OSI repository system, a selection, from the client computing device, of an OSI from the combined search results; and provide an instance of the selected OSI to the client computing device for either native or virtual use by the client computing device.

24. The computer program, product of claim 23, wherein the collaborative operation further comprises checking license metadata associated with the selected OSI to determine whether all licenses associated with the selected OSI have availability for providing an instance of the selected OSI to the client computing device, and wherein the instance of the OSI is provided to the client computing device only if all licenses associated with the selected OSI have availability to be provided to the client computing device.

25. An apparatus, comprising:

a processor; and a memory coupled to the processor, wherein the memory comprises instructions which, when executed by the processor, cause the processor to implement a first operating system image (OSI) repository that:

associates the first OSI repository system with a second OSI repository system, wherein each of the first and second OSI repository systems store one or more OSIs for use either natively or virtually by client computing devices;

defines one or more collaboration rules that define a manner by which OSI information in the first OSI repository system is shared with the second OSI repository system; and performs a collaborative operation between the first OSI repository system and the second OSI repository system, wherein an extent of the collaborative operation is circumscribed by application of the one or more collaboration rules.

* * * * *